3,501,436
FLAME-RESISTANT POLYEPOXIDE COMPOSITIONS
Paul R. Avis and Jurrianus Bekooy, Delft, Netherlands, Harald H. O. Cherdron, Ittenbach (Rhine), Germany, Tette J. Dijkstra, Delft, Netherlands, and Hans H. W. Ohse, Oberdollendorf (Rhine), and Richard A. Palm, Niederdollendorf (Rhine), Germany, assignors to Shell Oil Company, New York, N.Y., a corporation of Delaware
No Drawing. Filed Mar. 25, 1966, Ser. No. 537,289
Claims priority, application Germany, May 19, 1965, S 97,183
Int. Cl. C08g 30/02
U.S. Cl. 260—37                                    10 Claims

ABSTRACT OF THE DISCLOSURE

This invention relates to flame-resistant polyepoxide compositions which can be converted with epoxy curing agents to form non-flammable insoluble infusible products, which compositions comprise a mixture of a polyepoxide, and preferably a glycidyl polyether of a polyhydric phenol or alcohol, and a flame-proofing amount of a halogenated beta-lactone, and preferably a beta-(alkylhalogenated)-beta-lactone.

---

This invention relates to new flame-resistant polyepoxide compositions and their preparation. More particularly, the invention relates to new flame resistant polyepoxide compositions which may be cured in the presence of epoxy curing agents, and if desired an accelerator, to form products useful in the preparaton of difficultly flammable, self-extinguishing or non-flammable molded articles, laminates, impregnating agents or coatings.

Specifically, the invention provides new and particularly useful flame-resistant polyepoxide compositions which can be converted with epoxy curing agents to form non-flammable insoluble infusible products having attractive physical properties, which compositions comprise a mixture of a polyepoxide, and preferably a glycidyl polyether of a polyhydric phenol or alcohol, and a flame-proofing amount of a hereinafter described halogenated beta-lactone, and preferably a beta-(alkylhalogenated)-beta-lactone.

The growing interest of the plastics processing industry in difficultly flammable, self-extinguishing or non-flammable paints, adhesives and impregnating agents, and in molding and casting resins for the preparation of molded articles, laminates and coatings which can resist overheating and are flame-retardant, has become increasingly important in recent years, particularly in electrical engineering and in the building industry. There has, therefore, been no lack of attempts to improve the flame-retardant properties of polyepoxide resins in the cured state by modification with, for example, halogen or phosphorous-containing compounds.

It is known to influence the flammability of polyepoxide resins by addition of substantial amounts of inorganic fillers. The amounts of filler, however, which are limited by practical considerations governed by the application envisaged, are insufficient to impart self-extinguishing properties to the cured products without thereby negatively affecting the mechanical properties of the resins.

The admixture of flame-retardant additives, usually organic and containing halogen or phosphorus, the effectiveness of which can be improved by means of antimony trioxide, has likewise failed to solve the problem satisfactorily, since these additives are as a rule not incorporated in the cross-linked resin molecule, with the result that there is often the risk of a subsequent migration, and almost invariably a deterioration in the mechanical properties of the cured products.

Another method for the preparation of self-extinguishing polyepoxide resins makes use of the incorporation of halogen-containing cross-linking or curing agents, the best-known representative of which is hexachloro endomethylene tetrahydrophthalic anhydride. Problems arise here, however, when incorporating these agents into the polyepoxide components since the melting points of sufficiently highly halogenated polycarboxylic anhydrides are too high.

Finally, a reduction in the flammability of the cured products can be achieved by introducing halogen into the epoxy components. Examples of this are the diglycidyl or polyglycidyl ethers of polyphenols or bisphenylol alkanes, halogenated in the nucleus, and also highly halogenated monoepoxides, which as so-called reactive diluents, such as for example the Diels Alder adduct from hexachlorocyclopentadiene and allyl glycidyl ether, lead to products with increased flame resistance after having been cured with the conventional cross-linking agents. There is substantially no difference between the mechanical properties of these self-extinguishing epoxy resins halogenated on the epoxy component and those of the flammable unhalogenated resins. On the other hand there are pronounced differences in the electrical properties, in particular in the tracking resistance which only shows strongly reduced values even in the types with the lowest halogen content.

It is an object of the invention, therefore, to provide new flame-resistant polyepoxide compositions and a method for their preparation. It is an object to provide flame-resistant polyepoxide compositions which can be cured to give products having attractive mechanical properties. It is a further object to provide flame-resistant polyepoxide compositions which when cured form products having good electrical properties. It is a further object to provide a method for preparing flame-resistant polyepoxide compositions which is easily accomplished by mixing the components together to form a product of low viscosity. It is a further object to provide compositions which do not lose components on being exposed to high cure temperatures. It is a further object to provide new flame-resistant cured polyepoxide compositions which retain their non-flammability over long periods of time without loss through migration or evaporation. It is a further object to provide new polyepoxide compositions which can be used in the preparation of difficultly flammable, self-extinguishing or non-flammable molded articles, laminates, impregnating agents or coatings. Other objects and advantages of the invention will be apparent from the following detailed description thereof.

It has now been discovered that these and other objects may be accomplished by the compositions of the invention comprising a mixture of a polyepoxide, and preferably a glycidyl polyether of a polyhydric phenol or alcohol, and a flame-proofing amount of a halogenated beta-lactone as described hereinafter, and preferably a beta-(alkyl-halogenated)-beta-lactone. It has been found that this special combination can be cured in the presence of an epoxy curing agent, and if desired accelerators, to form products which are not only insoluble and infusible but are nonflammable or self-extinguishing. Surprisingly, the cured products still retain excellent mechanical properties, and particularly good electrical properties which are normally lost when the known flame-proofing agents are employed. Further, these properties are of a permanent nature and are not lost through storage and use.

It should be noted that the above-noted special halogenated beta-lactones are added as copolymerizable components and not as simple additives. These components under the curing conditions are incorporated via ring-opening addition polymerization into the product to be crosslinked. In this connection, the halogenated beta-lactones according to the invention act as bifunctional compounds, which as carriers of potential carbonyl and hydroxyl groups are capable in the addition polymerization of forming ester bonds as well as ether bonds. In the formation of the cross-linked macromolecules from diepoxide or polyepoxide and polycarboxylic acid or its anhydride there are many reaction possibilities open to the halogenated bifunctional beta-lactone during the addition polymerization. Two examples of these possibilities are given below, though it is not suggested that they are either exhaustive or exclusive.

(a) Incorporation in the epoxy component, via a ring-opening addition polymerization, by means of reaction of the epoxy group with the opened cyclic ester group of the beta-lactone to form a polyester ether which contains several ester and ether units in the polymer chain. As a result of the bifunctional nature of each incorporated beta-lactone molecule, the number of functional groups in the polyester ether molecule capable of cross-linking with polycarboxylic acids or their anhydrides is not reduced by this reaction.

(b) Reaction of the beta-lactones "with opened ring" with the polycarboxylic acid or its anhydride to form a polycarboxylic acid ester or polycarboxylic anhydride ester which with preservation of the number of potential carboxylic groups can further react with the epoxy component.

As a result of the bifunctional nature of the halogenated beta-lactones the number of cross-linking points, when these lactones are incorporated into the addition polymer to be cross-linked, is not reduced in comparison with a standard polyepoxide resin, but is at least maintained so that the known good mechanical properties of the cured products are retained. Evidence that the polyepoxide resins modified by the halogenated lactones according to the invention are genuine copolymerizates is provided by the fact that no homopolymers can be extracted from the cured products according to the invention by solvents for homopolymeric polyesters from halogenated beta-lactones, even when long extraction times are used.

Suitable halogenated beta-lactones are compounds having the general formula:

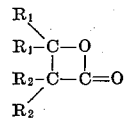

in which $R_1$ represents a halogenated alkyl or cycloalkyl group having 1 to 6 carbon atoms, a halogenated aryl group or a hydrogen atom, and $R_2$ represents a halogenated or unhalogenated alkyl group having 1-4 carbon atoms, or a hydrogen atom, on condition that either at least one $R_1$ or $R_2$ is a polyhalogenated substituent, or that more than two monohalogenated substituents are contained in the molecule.

Examples of the halogenated beta-lactones which can be used according to the invention include: 3-trichloromethyl - beta - propiolactone, 3,3-bis(trichloromethyl)- beta - propiolactone, 3,3-bis(trifluoromethyl)-beta-propiolactone, 3 - trifluoromethyl-beta-propiolactone, 3-pentachloroethyl - 3 - trichloromethyl-beta-propiolactone, 3,3-bis(pentachloroethyl)-beta-propiolactone, 2,2 - dimethyl-3-trichloromethyl-beta-propiolactone, 3 - dichlorophenyl-3-trichloromethyl - beta - propiolactone,3-polychlorocyclohexyl - 3 - trichloromethyl-beta-propiolactone, etc.

The halogenated beta-lactones according to the invention can be obtained, for example, from ketene or the correspondingly substituted ketenes by reaction with halogenated aldehydes or ketones. They are liquids or low-melting substances which, unlike the halogen-containing polycarboxylic anhydrides, can be mixed extraordinarily easily both with the epoxy component of the addition polymerization and also with the polycarboxylic acid (anhydride) cross-linking agent, and have furthermore the advantage of reducing the viscosity of the mixture.

Furthermore, the reaction mixtures according to the invention, which are capable of addition polymerization at elevated temperatures, are marked by excellent storage stability and in the cured state display no deterioration of the electrical properties as compared with the resins halogenated in the epoxy component.

Polyepoxides suitable for addition polymerization with the chlorinated lactones are compounds having on average more than one epoxy group per molecule. The average number of epoxy groups per molecule is obtained by dividing the average molecular weight of the epoxy compound by its epoxy equivalency. The polyepoxides may be unsaturated or saturated, aliphatic, cycloaliphatic, aromatic or heterocyclic compounds and may be unsubstituted or substituted by groups such as hydroxyl groups, halogen atoms, either radicals and the like, which do not disturb the cross-linking properties.

The preferred diepoxides and polyepoxides are the glyciyl ethers of polyhydric phenols, such as those of diphenylol alkanes, for example diphenylol propane, diphenylol ethane, diphenylol methane, and of diphenylol sulphone, hydroquinone, resorcinol, dihydroxydiphenyl, dihydroxynaphthalene, and of polyhydric phenols such as the intermediate products of novolak and resol resin, such as obtained in the condensation of substituted or unsubstituted phenols or naphthols with formaldehyde.

Glycidyl ethers of polyhydric phenols can be prepared according to various methods. One method, for example, is to react a polyhydric phenol with epichlorohydrin in the presence of a base such as sodium or potassium hydroxide. The glycidyl ethers of 2,2-bis(4-hydroxyphenyl) propane are valuable polyepoxide compounds. The molecular weight, the softening point and the viscosity of these glycidyl ethers depend to a large extent on the ratio in which the epichlorohydrin is reacted with the polyhydric phenol. Reaction with a large excess of epichlorohydrin, e.g. 10 mol of epichlorohydrin to 1 mol of 2,2-bis(4-hydroxyphenyl)propane, gives glycidyl ethers having a low molecular weight. In some cases the polyglycidyl ethers may contain small amounts of compounds in which the terminal glycidyl group is present in hydrated form. The diglycidyl and polyglycidyl ethers of 2,2-bis(4-hydroxyphenyl)propane having a molecular weight between 340 and 4,000 are the most suitable for the addition polymerization with the halogenated beta-lactones according to the invention.

Other polyepoxide compounds which can enter into addition polymerization with the halogenated beta-lactones are the poly(epoxyalkyl) ethers of aliphatic polyhydroxy compounds such as ethylene glycol, glycerol, and trimethylol propane; poly(epoxyalkyl) esters of polycarboxylic acids, such as the diglycidyl esters of phthalic acid, terephthalic acid, adipic acid, as well as polyglycidyl esters of polymeric unsaturated fatty acids, e.g. the diglycidyl ester of the dimeric linoleic acid; epoxidized esters of unsaturated acids, such as epoxidized linseed oil or soy-bean oil; epoxidized dienes such as diepoxy butane and epoxidized vinyl cyclohexene; di(epoxyalkyl) ethers, in which two epoxy alkyl groups are united by an oxygen atom, such as for example diglycidyl ether, and finally, polyepoxide compounds which are obtained by epoxidation of cyclohexene derivatives, such as the (3,4-epoxy-6-methyl cyclohexyl)methyl ester of 3,4-epoxy-6-methyl cyclohexane carboxylic acid.

Other examples of polyepoxides to be used may be found in U.S. Patent 2,633,458.

The proportions of halogenated beta-lactones in the reaction mixtures with the diepoxide or polyepoxide compounds can vary within relatively wide limits depending on the application envisaged for the cured products. For example, even 5 parts by weight of the chlorinated beta-lactones according to the invention with 100 parts of epoxy compound impart self-extinguishing properties to the cured products, while proportions of 8–20% by weight, based on the epoxy compound, furnish non-flammable products.

Suitable cross-linking or curing agents for the addition polymerization of the halogenated beta-lactones with the epoxy compounds, which is carried out at an elevated temperature are, firstly, polycarboxylic anhydrides. The following may be mentioned by way of example: phthalic anhydride, hexahydrophthalic anhydride, tetrahydrophthalic anhydride, pyromellitic dianhydride, endomethylene tetrahydrophthalic anhydride, methylendomethylene tetrahydrophthalic anhydride, succinic anhydride, alkyl or alkenyl succinic anhydrides, such as dodecenyl succinic anhydride and hexachloroendomethylene tetrahydrophthalic anhydride. Mixtures of polycarboxylic anhydrides can also be used.

The proportions of polycarboxylic anhydride to diepoxide or polyepoxide compounds in the addition polymerization, expressed as a ratio of acid equivalency to epoxy equivalency, lie generally between 0.8 and 2.3 and are preferably between 1.1 and 1.7, for example when use is made of phthalic anhydride. Instead of the polycarboxylic anhydrides in the addition polymerization of the halogenated beta-lactones with the diepoxide or polyepoxide compounds use may also be made of aromatic amines, such as diaminodiphenyl methane, diaminodiphenyl sulfone, meta-phenylene diamine, such as the addition products of aromatic amines with monoepoxide compounds.

Accelerators may be added to the reaction mixtures in order to shorten the curing time and to reduce the reaction temperature. Examples of such accelerators include: phenols, sulfides, mercaptans, organic phosphines and arsines, in addition to organic antimony compounds: amines, amine salts and quaternary ammonium salts. As amines use may be made, for example of benzyl dimethylamine, tris(dimethylaminomethyl)phenol, dicyandiamide, p,p-bis(dimethylaminophenyl)methane, pyridine, dimethylaniline, dimethyl ethanolamine, methyl diethanolamine, morpholine, dimethylamino propylamine, dibutylamino propylamine, stearyldimethylamine, tributylamine, triamylamine, tri-m-hexylamine, ethyl-di-m-propylamine, m-phenylenediamine, polyalkylene polyamines such as diethylene triamine, and mixtures of the said amines. Suitable salts are those of inorganic or organic acids such as the chlorides, sulfates, acetates of the said tertiary amines. Examples of the quaternary ammonium salts are: benzyl trimethyl ammonium chloride, phenyl tributyl ammonium chloride, cyclohexyl tributyl ammonium sulfate, benzyl trimethyl ammonium sulfate, benzyl trimethylammonium borate, diphenyl dioctyl ammonium chloride and mixtures thereof. Nitrogen-containing heterocyclic compounds such as C-alkylated imidazoles can also be used as accelerators in the addition polymerization. An example thereof is the 2-ethyl-4-methylimidazole.

The said accelerators are generally added in amounts of from 0.1 to 4 parts by weight per 100 parts of epoxy compound.

In general the reaction components can be mixed in any desired sequence before the beginning of the addition polymerization reaction. It is possible, for example, to dissolve the chlorinated beta-lactones according to the invention in the epoxy compounds and in the polycarboxylic anhydrides, if desired with slight heating. It is a matter of indifference whether only the curing agents are added to the solution of the halogenated beta-lactone in the epoxy compound or whether a mixture of halogenated beta-lactone with polycarboxylic acid in the liquid state is given to the epoxy compound. When using accelerators it is advisable to add these to the reaction mixtures as the last component. Prior to the curing process, solvents, diluents, pigments, fillers, fibrous materials, dyes, plasticizers and non-volatile extenders can be added to the reaction mixtures according to the invention which are capable of addition polymerization. Intermediate products of phenolic resins, melamine resins, polyvinyl acetate or organopolysiloxane can also be added without difficulty to the reaction mixtures. Active diluents such as monoepoxy compounds, e.g. butyl glycidyl ethers, phenyl glycidyl ethers and monoglycidyl esters of monocarboxylic acids which participate in the cross-linking process, can also be added in amounts of up to 20% by weight, based on the diepoxide or polyepoxide compound. Nonactive, non-volatile extenders include the following: coal tar, refined coal tar, coal tar pitch, asphalt, pine resin, lubricating oil fractions and aromatic extracts thereof, in addition to lubricating oil raffinates and mixtures thereof.

In addition to the halogenated beta-lactones for increasing flame resistance well-known flame retardant additives or soluble antimony salts such as for example antimony trioxide can be added in small amounts to the reaction mixtures capable of addition polymerization so that the mechanical and electrical properties of the cured products are not affected.

The temperatures and reaction times necessary for carrying out the addition polymerization depend on the choice of epoxy and curing components. The addition polymerizations can be carried out in one or more stages, depending in each case on the envisaged application for the cured adducts. In general curing temperatures between 50° C. and 180° C. are used. In such a case reaction times may vary between one and up to a total of 20 hours.

The moulding compositions claimed according to the invention are suitable for use as casting resins for the preparation of difficultly flammable, self-extinguishing or non-flammable moulded articles such as electrical components or, in combination with glass fibre rovings or woven rovings, or other fibrous materials, as impregnating agents for the preparation of non-flammable laminates. They can be used as flame-resistant encapsulating or sealing compounds for electric circuits or cable splices, and also, if necessary with the use of suitable flexibilizers, as protection for electrical components which are sensitive to pressure and temperature, such as transistors, diodes, condensers and ceramic resistances. Further fields of application are opened up by the manufacture of modern office machines and computers, where the endeavor to crowd more and more connections per unit of surface area entails the risk of overloading and eventially of self-ignition, so that exclusively non-flammable components become necessary.

Furthermore the moulding compositions according to the invention are suitable for use as flame-retardant impregnating agents for textiles from synthetic or natural fibers, for the preparation of non-flammable, porous plastics with the use of suitable blowing agents or of fine glass-based hollow spheres, which plastics are used as insulating materials in electrical engineering, as floorings or wall coatings, as insulating material against cold, heat and sound, and in the manufacture of coach-work, boat and aircraft parts, in addition to flame-retardant light construction materials.

The invention will now be elucidated by means of the following examples. The parts given are parts by weight.

For the determination of the flame-retardant properties the ASTM-Method D 635–63 was selected from the large number of test methods available since it has also been adopted in the NEMA specifications which lay down directives for European standardization. In the remaining determinations the following standards were used:

| | |
|---|---|
| Vicat softening point (° C) | British Standard Method 2782–102D. |
| Tracking resistance | VDE 0303 (DIN 53480). |
| Dielectric constant ($\Sigma$) | ASTM D 150–54 T. |
| Loss factor (tg$\delta$) | ASTM D 150–54 T. |
| Flexural stress (kg./cm.$^2$) | I.S.O. R 178. |
| Deflection (mm.) | I.S.O. R 178. |
| Flexural stress at maximum load (break) (kg./cm.$^2$) | I.S.O. R 178. |
| Deflection at break (mm.) | I.S.O. R 178. |
| Modulus of elasticity in flexure | I.S.O. R 178. |

As epoxy component use was made of a glycidyl ether of the 2,2-bis(4'-hyldoxyphenol)propane having an average molecular weight of 380 and an epoxy equivalency of 175–210. This is referred to hereinafter as Polyether A.

EXAMPLE I

The moulding compositions listed in the following table were prepared by thoroughly mixing the components Polyether A, curing agents and halogenated beta-lactone at 25° C.–35° C., and by adding the accelerator with stirring as final component to the liquid mixture. The Vicat softening point and the flammability of the castings which had been cured for 1½ hours at 80° C. and 4 hours at 150° C., were determined. A liquid mixture of 90 parts of hexahydrophthalic anhydride (HPA) and 10 parts of a $C_{12}$–$C_{18}$ alkylated succinic acid anhydride was used as curing agent, the 3-trichloromethyl-beta-propiolactone (TCPL) was used as halogenated beta-lactone and benzyl-dimethylamine (BDMA) as accelerator.

| No. | Reactants | Weight ratio | Vicat Softening Point | Flammability |
|---|---|---|---|---|
| 1 | Polyether A/HPA/BDMA | 100/81/2 | 132 | Flammable. |
| 2 | Polyether A/HPA/TCPL/BDMA | 100/80/20/2 | 112 | Non-flammable. |
| 3 | do | 100/80/20/0.5 | 110 | Do. |

The cured castings 1 and 3 were powdered and subsequently extracted in the Soxhlet apparatus for 1 hour with boiling methyl ethyl ketone. After the solvent had been evaporated 2.1(1) and 2.7(3)% by weight respectively of extraction residue resulted, which indicates that the halogenated beta-lactone is completely incorporated into the addition polymer.

EXAMPLE III

In this example the accelerator of Example II was changed and 2-ethyl-4-methyl-imidazole (Curing Agent M) was used. Reaction time (in hours)/reaction temperature (° C.): 3/80°+4/150°.

| Reactants | Weight Ratio | Vicat Softening Point | Flammability. |
|---|---|---|---|
| Polyether A/HPA/Curing Agent M | 100/80/0.5 | 136.5 | Flammable. |
| Polyether A/HPA/TCPL/Curing Agent M | 100/80/21.6/0.5 | 116 | Non-flammable. |

In this case, too, approximately 10% by weight of TCPL based on the total amount of resin, was sufficient to make the system non-flammable.

EXAMPLE IV

The reactants listed in the table were mixed in the weight ratios shown, in the manner described in Example I, with the difference that antimony trioxide was dispersed with intensive stirring in the liquid molding composition as final component. In the flammability test the burning time, i.e. the time taken by the test specimen to extinguish itself after having been ignited for 30 seconds, was determined in seconds, according to ASTM D 635–63, in order to provide further differentiation. The values shown present average values from ten tests.

| Number | Reactants | Weight Ratio | Vicat Softening Point | Flammability |
|---|---|---|---|---|
| 1 | Polyether A/HPA-alkylated succinic anhydride/BDMA | 100/90/2 | 118.5 | Flammable. |
| 2 | Polyether A/HPA-alkylated succinic anhydride/TCPL/BDMA | 100/85/5/2 | 118.5 | Self-extinguishing. |
| 3 | do | 100/80/10/2 | 113 | Do. |
| 4 | do | 100/80/15/2 | 110 | Do. |
| 5 | do | 100/80/20/2 | 109 | Non-flammable. |
| 6 | do | 100/75/15/2 | 109 | Self-extinguishing. |
| 7 | do | 100/70/20/2 | 106 | Non-flammable. |

It can be seen from the table that 2–3% by weight of TCPL, based on the total amount of resin is already sufficient to give a self-extinguishing product, and that 10% by weight of TCPL in the reaction mixture imparts non-flammability to the cured moulded articles.

EXAMPLE II

The molding compositions listed in the following table were prepared and cured as described in Example I, with the difference that hexahydrophthalic anhydride (HPA) was used as dicarboxylic anhydride and that the reaction times were 2 hours at 80° C. and 4 hours at 150° C.

Curing procedure: 3 hours at 80° C. and 4 hours at 150° C.

| Reactants | Weight Ratio | Vicat Softening Point | Burning time in seconds |
|---|---|---|---|
| Polyether A/HPA/TCPL/Sb$_2$O$_3$/Curing Agent M | 100/80/—/9/0.5 | 145 | 75 |
| Do | 100/80/21.6/4/0.5 | 121 | 15 |
| Do | 100/80/21.6/10.8/0.5 | 118.5 | 2 |

The table shows on the one hand that the flammability of conventional $Sb_2O_3$-containing epoxy resin systems can be considerably reduced by the incorporation of halogenated beta-lactones, and on the other hand that the flammability of the molding compositions according to the invention can be further reduced by the incorporation of antimony trioxide.

EXAMPLE V

In the following table the burning times (determined as described in the preceding Example IV) of a molding composition (1) according to the invention are compared with those (2–4) of a known system containing a halogenated dicarboxylic anhydride, viz hexachloroendomethylene tetrahydrophthalic anhydride (HET). The molding composition 1 was prepared as described in Example I, while the casting resins 2–4 were obtained by mixing both anhydrides (HPA+HET) at elevated temperatures and by stirring then into a mixture of Polyether A and halogenated beta-lactone which had been heated to approximately 35° C. Curing procedure as in Example IV.

| No. | Reactants | Weight Ratio | Average burning time in minutes |
|---|---|---|---|
| 1 | Polyether A/HPA/TCPL/Curing Agent A. | 100/80/20/0.5 | 1 |
| 2 | Polyether A/HPA/HET/BDMA | 100/65.2/18.8/2 | 4¼ |
| 3 | do | 100/60/24.8/2 | 3¼ |
| 4 | do | 100/54.8/31.6/2 | 2¼ |

The burning times show that even larger proportions of halogenated dicarboxylic anhydride (HET) are less effective with respect to the flammability than the halogenated beta-lactones (e.g. TCPL) according to the invention.

EXAMPLE VI

From the reactants listed in the table a casting resin was prepared as described in Example I in the weight ratios shown, and cured in molds by heating at 80° C. for 2 hours and a subsequent heating at 150° C. for 20 hours. As cross-linking agent use was made of a bicyclic anhydride, methyl endomethylene tetrahydrophthalic anhydride, which can be obtained under the trade name "Methyl Nadic Anhydride" (MNA).

| Reactants | Weight Ratio | Flammability | Burning time in minutes |
|---|---|---|---|
| Polyether A/MNA/TCPL/Curing Agent M | 100/90/–/0.5 | Flammable | 7 |
| Do | 100/90/22.8/9.5 | Non-flammable | ½ |

In these epoxy resin systems also the halogenated beta-lactones display good flame-retardant activity.

EXAMPLE VII

As copolymerizable halogenated beta-lactones in the following molding compositions use was made of 3,3-bis(trichloromethyl)-beta-propiolactone (HCPL, tests 2–3) and 3,3-bis(trifluoromethyl)-beta-propiolactone (HFPL) in test 5.

Curing procedures 1–3: 6 hours at 80° C.+4 hours at 150° C.; 4 and 5: 3 hours at 80° C.+4 hours at 150° C.

| Number | Reactants | Weight Ratio | Vicat Softening Point | Flammability | Burning time in minutes |
|---|---|---|---|---|---|
| 1 | Polyether A/HPA/HCPL/Curing agent M | 100/80/–/0.5 | 137 | Flammable | 9½ |
| 2 | do | 100/80/11.1/0.5 | 115 | Self-extinguishing | 2½ |
| 3 | do | 100/80/17.0/0.5 | 105 | Nonflammable | 1 |
| 4 | Polyether A/HPA/HFPL/Curing agent M | 100/80/–/0.5 | 136.5 | Flammable | 9½ |
| 5 | do | 100/80/22/0.5 | 121.5 | Nonflammable | 1¾ |

The castings of tests 3 and 5 were powdered and extracted in the Soxhlet apparatus with methyl ethyl ketone for 1 hour at 50° C. Extraction residue (percent by weight based on the total amount of resin): Test 3: 1.4%. Test 5: 1.1%.

In this case also the halogenated beta-lactones were completely incorporated in the cross-linked addition polymer.

In addition the tracking resistance was determined for the tests 4 and 5. The value $T_{5c}$ yielded was the optimum result.

EXAMPLE VIII

In accordance with the weight ratios and curing procedures shown in the following table, 5 castings were prepared as described in Examples I and IV (3), and the mechanical properties of the flammable standard resins (casting 1 or 4) were compared with those of the nonflammable addition polymers having halogenated beta-lactones (2, 3 and 5).

| Casting | Reactants | Weight Ratio | Curing Procedure, Hours/° C. |
|---|---|---|---|
| 1 | Polyether A/HPA/A/BDMA | 100/80/1 | 2/80+4/150 |
| 2 | Polyether A/HPA/TCPL/BDMA | 100/80/20/0.5 | 2/80+4/150 |
| 3 | Polyether A/HPA/TCPL/Sb₂O₃/Curing Agent M | 100/80/20/4/0.5 | 2/80+4/150 |
| 4 | Polyether A/MNA/Curing Agent M | 100/90/0.5 | 2/80+20/150 |
| 5 | Polyether A/MNA/TCPL/Curing Agent M | 100/90/22.8/ | 2/80+20/150 |

| | Casting 1 | Casting 2 | Casting 3 | Casting 4 | Casting 5 |
|---|---|---|---|---|---|
| Flexural stress (kg./cm.²) | 1,385±4.1 | 1,331±7 | 1,251±12 | | |
| Deflection (mm.) | 9.2±0.1 | 8.9±1 | 9.2±0.1 | | |
| Flexural stress at maximum load (break) (kg./cm.²) | 1,335±43 | 1,208±61 | 1,186±32 | 1,186+122 | 1,198±179 |
| Deflection at break (mm.) | 11.4±1.1 | 12.0±0.9 | 9.9±2.0 | 7.7±1.6 | 5.6±1.3 |
| Modulus of elasticity in flexure (kg./cm.²) | 32,000±1,700 | 32,100±800 | 31,000±600 | 34,100±800 | 33,700±600 |

The table indicates that the good mechanical properties of the flammable standard resins are maintained substantially unchanged, within the limits of error of the test methods employed, even in the addition polymers modified with up to 20% by weight (based on the epoxy component) of halogenated beta-lactones.

EXAMPLE IX

From the reactants listed in Example I (A) and Examples V/2–4 (B), in the weight ratios shown in the table below, impregnating agents were prepared which were used to impregnate glass fiber bonded mats consisting of 14 layers. The laminates which were cured for 2 hours at 80° C. and 4 hours at 150° C. contained 69% of glass fibers. Both laminates (diameter approx. 3 mm.) which displayed comparable flame-retardant activity with respect to the flammability nevertheless showed distinct differences with regard to the tracking resistance. While laminate A, prepared according to the invention, showed the optimum value $T_{5c}$, the laminate B, prepared with a halogenated dicarboxylic anhydride (HET) as cross-linking agent displayed a considerable drop in tracking resistance.

| Laminate | Reactants | Weight Ratio | Tracking Resistance | Flexural stress, kg./cm.² |
|---|---|---|---|---|
| A | Polyether A/HPA/TCPL/Curing Agent M | 100/80/20/1 | $T_{5c}$ | 4,908±72 |
| B | Polyether A/HPA/HET/Curing Agent M | 100/58/38/1 | $T_1$ | 5,183±74 |

EXAMPLE X

In the following table a number of electrical properties of a cured flammable standard epoxy casting resin (casting 1) are compared with those of 3 non-flammable cured casting resins according to the invention (castings 2–4).

| Casting | Reactants | Weight ratio | Reaction Procedure, Hours/0 °C. |
|---|---|---|---|
| 1 | Polyether A/HPA/BDMA | 100/80/1 | 2/80+4/150 |
| 2 | Polyether A/HPA/TCPL/BDMA | 100/80/20/0.5 | 2/80+4/150 |
| 3 | Polyether A/HPA/TCPL/Curing Agent M | 100/80/20/0.5 | 2/80+4/150 |
| 4 | Polyether A/HPA/TCPL/Sb₂O₃/Curing Agent M | 100/80/20/4/0.5 | 2/80+4/150 |

| Casting | Tracking Resistance | Meas. Temp. | Dielectric Constant | | | | Loss factor (tg δ)ₓ | | | |
|---|---|---|---|---|---|---|---|---|---|---|
| | | | 100 c./s. | 1 kc./s. | 10 kc./s. | 100 kc./s. | 100 c./s. | 1 kc./s. | 10 kc./s. | 100 kc./s. |
| 1 | $T_{5c}$ | 250 | 3.20 | 3.16 | 3.09 | 3.09 | 72 | 126 | 154 | 129 |
| | | 750 | 3.29 | 3.27 | 3.24 | 3.17 | 23 | 43 | 99 | 157 |
| | | 1,250 | 3.29 | 3.27 | 3.26 | 3.22 | 44 | 33 | 46 | 100 |
| | | 1,500 | 4.13 | 3.73 | 3.55 | 3.45 | 840 | 450 | 239 | 198 |
| 2 | $T_{5c}$ | 20 | 3.17 | 3.14 | 3.08 | 3.02 | 52 | 103 | 132 | 119 |
| | | 75 | 3.30 | 3.28 | 3.26 | 3.21 | 53 | 29 | 70 | 129 |
| | | 130 | 4.0 | 3.66 | 3.50 | 3.40 | 813 | 444 | 236 | 189 |
| 3 | $T_{5c}$ | 20 | 3.25 | 3.22 | 3.15 | 3.09 | 55 | 109 | 141 | 128 |
| | | 75 | 3.22 | 3.21 | 3.19 | 3.14 | 30 | 33 | 77 | 139 |
| | | 130 | 4.21 | 3.78 | 3.59 | 3.47 | 1,094 | 560 | 286 | 246 |
| 4 | $T_{5b}$ | 22 | 3.26 | 3.25 | 3.21 | 3.14 | 56 | 113 | 148 | 137 |
| | | 55 | 3.21 | 3.17 | 3.11 | 3.04 | 29 | 57 | 118 | 150 |
| | | 80 | 3.25 | 3.23 | 3.22 | 3.17 | 33 | 32 | 72 | 135 |
| | | 135 | 4.52 | 3.87 | 3.62 | 3.49 | 2,074 | 363 | 360 | 233 |

The values in the table show that on the one hand the excellent tracking resistance of the flammable standard resins is maintained, compared with the non-flammable molding compositions, and that on the other hand no essential deterioration can be determined in the other electric properties in the addition polymers according to the invention.

EXAMPLE XI

For the preparation of the castings listed in the following table diaminodiphenylmethane (DDM) was used as cross-linking agent. The reactants were mixed at 30°–35° C. and the resultant molding compositions were cured for 2 hours at 80° C. and for 4 hours at 150° C.

| No. | Reactants | Weight Ratio | Vicat Softening Point | Burning time in seconds |
|---|---|---|---|---|
| 1 | Polyether A/DDM | 100/27 | 164 | 40 |
| 2 | Polyether A/DDM/TCPL | 100/32.3/10.1 | 153 | 5 |
| 3 | do | 100/35.5/16.2 | 144.5 | 2 |
| 4 | do | 100/27/15.2 | 117 | 6 |

The halogenated beta-lactones according to the invention also display pronounced flame-retardant activity in epoxy/aromatic amine systems.

EXAMPLE XII

Examples I to XI are repeated with the exception that Polyether A are replaced with each of the following: diglycidyl ether of resorcinol, diglycidyl ether of 2,2-bis-(4-hydroxyphenyl)butane, glycidyl polyether of polyepichlorohydrin having a structure as in U.S. Patent No. 3,058,921 and a molecular weight of 615 and a glycidyl ether of trihydroxy benzene.

Related results are obtained in each case.

We claim as our invention:

1. A composition comprising a reaction product of a polyepoxide possessing more than one vic-epoxy group, and a flame-proofing amount of a chlorinated or fluorinated beta-lactone having the general formula

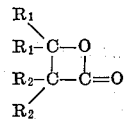

in which $R_1$ is a member of the group consisting of chlorinated or fluorinated alkyl and cycloalkyl radicals having 1–6 carbon atoms, chlorinated or fluorinated aryl radicals and a hydrogen atom, and $R_2$ is a member of the group consisting of a chlorinated or fluorinated radical having 1–4 carbon atoms, an unsubstituted alkyl radical having from 1–4 carbon atoms, and a hydrogen atom, on condition that either at least $R_1$ or $R_2$ is a polychlorinated or polyfluorinated substituent or that more than two monochlorinated or monofluorinated substituents are contained in the lactone molecule.

2. A composition as claimed in claim 1, characterized in that 3-trichloromethyl-beta-propiolactone is used as the beta-lactone.

3. A composition as claimed in claim 1, characterized in that 3,3 - bis(trichloromethyl)-beta-propiolactone is used as the beta-lactone.

4. A composition as claimed in claim 1, characterized in that 3,3-bis(trifluoromethyl)-beta-propiolactone is used as the beta-lactone.

5. A composition as claimed in claim 1, characterized in that from 5% to 8% by weight of beta-lactone, based on the epoxy components, is used to obtain self-extinguishing products.

6. A composition as in claim 1, characterized in that up to 25% by weight of beta-lactone, based on the epoxy components, is used to obtain non-flammable products.

7. A composition as in claim 1 wherein an epoxy curing agent is also included in the composition.

8. A composition as in claim 1 wherein a polycarboxylic acid anhydride is included as curing agent.

9. A composition as in claim 1 wherein the composition also contains a polycarboxylic acid anhydride and an amine accelerator.

10. A composition as in claim 1 wherein the composition also contains antimony trioxide.

References Cited

UNITED STATES PATENTS

| | | |
|---|---|---|
| 2,744,845 | 5/1956 | Rudoff. |
| 3,198,756 | 8/1965 | Richter. |
| 3,222,312 | 12/1965 | Wyart. |
| 3,294,743 | 12/1966 | Mack. |
| 3,354,102 | 11/1967 | Vuillemenont. |
| 3,355,511 | 11/1967 | Schwarzer _____ 260—830 |

OTHER REFERENCES

Modern Plastics, October 1964, vol. 42, #2, pp. 84–89, 168, 170, 172.

Lee and Neville: "Handbook of Epoxy Resins," McGraw-Hill, New York, 1957, pages 116–117 and 126–127.

MORRIS LIEBMAN, Primary Examiner

P. R. MICHL, Assistant Examiner

U.S. Cl. X.R.

260—830, 47